US005431989A

United States Patent [19]

Beltzung et al.

[11] Patent Number: 5,431,989

[45] Date of Patent: Jul. 11, 1995

[54] PRINTING BLANKET WITH TWO FOAM LAYERS

[75] Inventors: Michel Beltzung, Mulhouse; Bertrand Felly, Feldkirch, both of France

[73] Assignee: Rollin S.A., Cernay, France

[21] Appl. No.: 127,464

[22] Filed: Sep. 27, 1993

Related U.S. Application Data

[63] Continuation of Ser. No. 672,261, Mar. 20, 1991, abandoned.

[30] Foreign Application Priority Data

Mar. 23, 1990 [FR] France ................................ 90 03771

[51] Int. Cl.$^{6}$ ........................... B32B 3/26; B32B 7/02

[52] U.S. Cl. .................................... 428/218; 428/212; 428/246; 428/250; 428/314.4; 428/314.8; 428/316.6; 428/909

[58] Field of Search ............... 428/909, 212, 246, 250, 428/286, 314.4, 314.8, 316.6, 218

[56] References Cited

U.S. PATENT DOCUMENTS

| | | | |
|---|---|---|---|
| 668,919 | 2/1901 | Hill et al. | 428/909 |
| 1,492,123 | 3/1924 | Decher | 428/909 |
| 1,938,301 | 12/1933 | Smith et al. | 428/909 |
| 3,147,698 | 9/1964 | Ross | 428/909 |
| 4,015,046 | 3/1977 | Pinkston et al. | 428/909 |
| 4,042,743 | 8/1977 | Larson et al. | 428/306 |
| 4,174,244 | 11/1979 | Thomas et al. | 428/909 |
| 4,303,721 | 12/1981 | Rodriguez | 428/909 |
| 4,471,011 | 9/1984 | Spöring | 428/909 |
| 4,770,928 | 9/1988 | Gaworowski et al. | 428/909 |
| 4,812,357 | 3/1989 | O'Rell et al. | 428/909 |

FOREIGN PATENT DOCUMENTS

| | | |
|---|---|---|
| 406097 | 11/1924 | Germany . |
| 1400932 | 7/1975 | United Kingdom . |
| 2056883 | 3/1981 | United Kingdom . |

OTHER PUBLICATIONS

European Search Report.

*Primary Examiner*—James D. Withers
*Attorney, Agent, or Firm*—Woodcock, Washburn, Kurtz, Mackiewicz & Norris

[57] ABSTRACT

The present invention relates to an elastic and compressible printing blanket element.

This element essentially comprises a lithographic or printing layer (1), a hard layer of elastomer (2), a layer of cellular rubber (3), a layer of fabric (4) and another layer (5) of cellular rubber forming a base layer and the modulus of elasticity in compression of which is identical with or smaller than the modulus of elasticity of the layer (3).

This printing element or blanket is applicable in any types of offset printing machines.

7 Claims, 3 Drawing Sheets

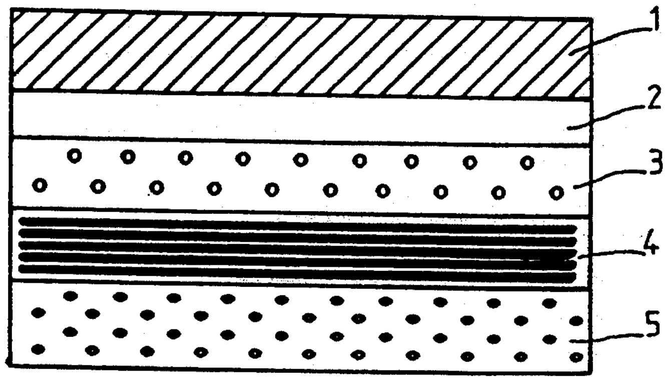
FIG. 1
FIG. 2
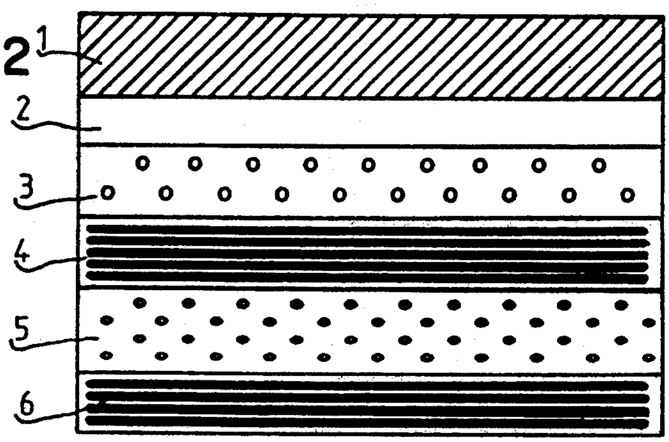
FIG. 3
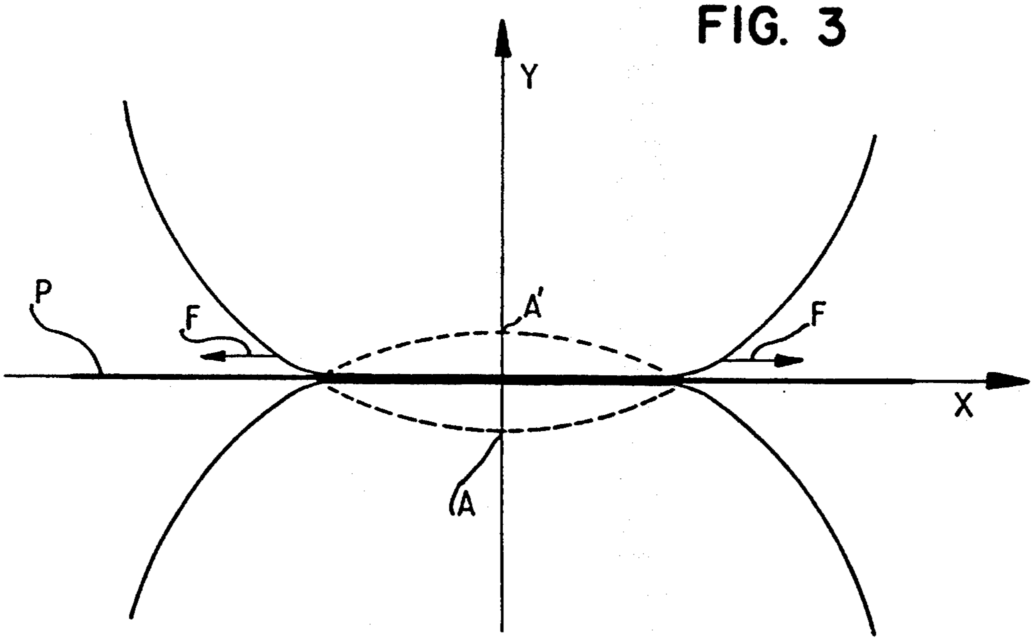

PRINTING BLANKET WITH TWO FOAM LAYERS

This is a continuation of application Ser. No. 07/672,261 filed on Mar. 20, 1991, now abandoned.

BACKGROUND OF THE INVENTION

The subject matter of the present invention essentially is an elastic and compressible printing element, this element constituting what is called a blanket which may be secured onto the surface of cylinders which are provided in the printing machines.

Most of the printing blankets presently used in the printing machines essentially comprise a lithographic layer allowing the transfer of information from the blanket-carrying cylinder onto a web of paper and a compressible structure consisting of a layer of cellular rubber placed in sandwich-like relationship between two fabric layers.

Now the compressibility of such a blanket, i.e. its possibility of becoming deformed under the effect of a force exerted by the machine upon the blanket-carrying cylinder bearing onto another blanket-carrying cylinder for instance remains limited. Therefore a relatively great force should be exerted upon the blanket and this force will result with time in a sagging of the blanket which will no longer recover its initial thickness and geometry. Moreover it should be noted that in the modern quick-operating printing machines heatings promoting the sagging of the blanket will occur and of course the quality of impression of the paper web passing between both blanket-carrying cylinders and the travelling of this web will be strongly affected.

Moreover with such blankets which are not very compressible and which generate high pressures for a given nip between both blanket-carrying cylinders there are substantial risks of shearing. More specifically the material which constitutes the blanket tends to move sidewise to form in a way protrusions which is highly harmful to the quality of impression of the web of paper and to the proper travelling of this web.

There has also been proposed in the document FR-A-2,461,596 a blanket essentially comprising a lithographic layer, a layer of cellular rubber and a stabilizing or base layer consisting of several layers of fabric bonded with neoprene.

Here again however such a blanket is likely to generate high pressures in the nip between both cylinders carrying the blankets whereas this should be avoided so as to not impair the structure of the blanket and such a blanket may also incur risks of shearing, i.e. of sidewise displacement of the material of the blanket which leads to the inconveniences mentioned above.

SUMMARY OF THE INVENTION

The object of the present invention is therefore to cope with all these inconveniences by proposing a blanket which will have no tendency when compressed to induce sidewise displacement of the material which constitutes it so that the quality of impression and the travelling of the paper web will remain satisfactory and which will always exhibit a dynamic neutral behaviour under the effect of a compression force.

For that purpose the subject matter of the invention is an elastic and compressible printing element of the type comprising a lithographic or printing layer with which is associated a structure with compressible layers, characterized in that the said structure consists of at least one layer of fabric or the like placed in sandwich-like fashion between two layers of cellular rubber having identical or different compressibility properties.

According to a preferred embodiment the layer of cellular rubber located towards the lithographic layer has a modulus of elasticity in compression higher than the other layer of cellular rubber.

According to another characterizing feature of the invention with the layer having a lower modulus of elasticity is associated a base layer of fabric or other reinforcing material.

According to another embodiment the layer with a lower modulus of elasticity itself constitutes the base layer.

The elastic and compressible printing element according to this invention further comprises a hard layer of elastomer possibly reinforced which is interposed between the lithographic layer and the layer of cellular rubber nearest to this lithographic layer.

According to another characterizing feature of the invention the thickness of the layer of fabric or the like is lying between about 0.1 and 1 mm and the thicknesses of both layers of cellular rubber are each one lying between 0.1 and 0.8 mm.

According to a preferred embodiment the thickness of the layer of fabric or the like is 0.35 mm, the thickness of the cellular layer with a lower modulus of elasticity is 0.5 mm and the layer of cellular rubber with a higher modulus of elasticity is 0.45 mm.

It should further be specified here that the thickness of the aforesaid hard layer of elastomer is lying between about 0.5 and 0.05 mm and preferably is equal to 0.15 mm.

According to still another characterizing feature of the printing element according to this invention both aforesaid layers of cellular rubber have a modulus of elasticity lying between about 0.2 and 50 megapascals (MPa) for the layer with a higher modulus of elasticity and between about 0.1 and 25 MPa for the layer with a lower elasticity.

According to a preferred embodiment the modulus of elasticity of the layer of cellular rubber located towards the lithographic layer is 10 MPa whereas the modulus of elasticity of the other layer of cellular rubber is 5 MPa.

It should further be specified here that the percentage of gas volume enclosed within both layers of cellular rubber, preferably within closed cells is lying between about 10 and 80% and preferably is equal to 30% for the layer with the higher modulus of elasticity and to 35% fop the layer with a lower modulus of elasticity.

The invention is also directed to the cylinders fitted with a printing blanket element meeting the characteristics referred to hereinabove.

DESCRIPTION OF THE DRAWINGS

Now further characteristics and advantages of the invention will appear better in the detailed description which follows and refers to the annexed drawings given by way of example only and wherein:

FIG. 1 is an enlarged sectional view of a printing blanket according to the invention;

FIG. 2 is an enlarged sectional view of another embodiment of the blanket according to this invention:

FIG. 3 diagrammatically and partially illustrates two blankets according to this invention in the compressed state and carried by two cylinders, respectively, between which passes a paper web, the whole being plotted in a reference system with orthogonal axes of coordinates where the axis of the abscissae coincides with the direction of the paper web and wherein the axis of ordinates intersects the axis of abscissae at the center of the compressed area of both blankets;

DETAILED DESCRIPTION OF THE INVENTION

Figure 4:
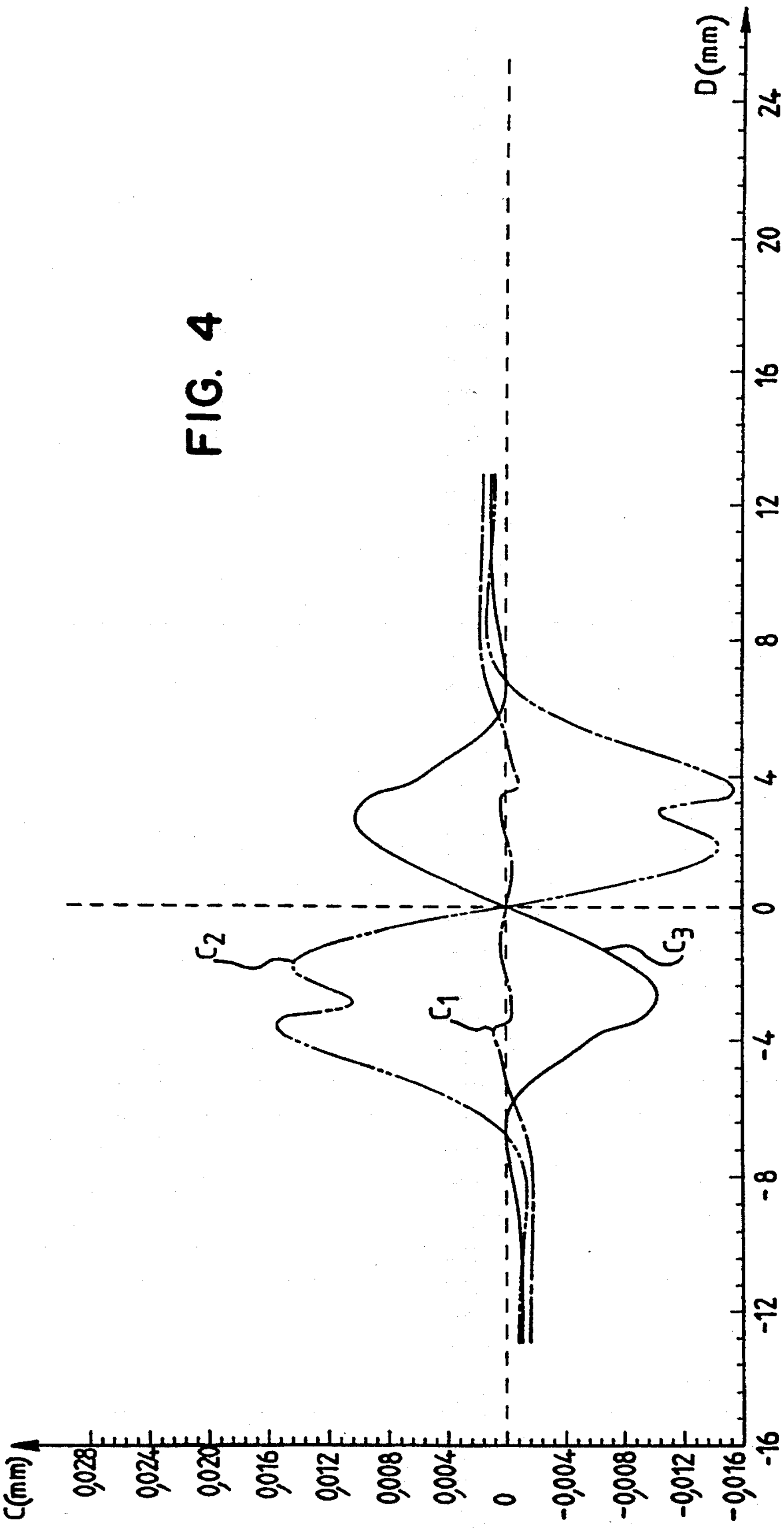
FIG. 4 shows three curves illustrating in millimeters the sidewise displacement of the material constituting the blanket on either side of the center O of the compression area—a deformation visible on FIG. 3, versus the distance from this point O and along the axis of abscissae OX on FIG. 3, these three curves respectively corresponding to a blanket such as currently used presently and which will be hereinafter called the prior art blanket, to a blanket according to the document FR-A-2,461,596 and to a blanket according to the invention.

According to the examplary embodiment shown on FIG. 1 an elastic and compressible element or printing blanket according to this invention successively comprises an outer lithographic or printing layer 1, a hard layer of elastomer 2, a layer of cellular rubber 3, a layer of fabric or the like 4 and another layer 5 of cellular rubber.

In the alternative embodiment shown on FIG. 2 there are found in the same order the layers 1 to 5 mentioned hereinabove but here the blanket in addition comprises a base layer 6 of fabric or other suitable reinforcing material.

When securing the blanket onto a cylinder (not shown) the base layer 6 should be applied onto the peripheral surface of this cylinder whereas in the case of the blanket of FIG. 1 the base layer applied onto the cylinder is constituted by the layer of cellular rubber 5.

In both embodiments shown in FIGS. 1 and 2 the layers of cellular rubber 3 and 5 may be identical or different with respect in particular to their moduli of elasticity.

Preferably the layer 3 located towards the lithographic layer 1 should have a higher modulus of elasticity in compression lying between about 0.2 and 5O MPa whereas the layer 5 forming the base layer (FIG. 1) or associated with the base layer 6 (FIG. 2) should have a lower modulus of elasticity lying between about 0.1 and 25 MPa. Thus the modulus of elasticity of the layer 3 may be equal to 10 MPa and the modulus of elasticity in compression of the other layer 5 of cellular rubber could be equal to 5 MPa.

It should be noted here that the difference in the moduli of elasticity between both layers of cellular rubber 3 and 5 could be obtained by a variation in the percentage of gas volume enclosed within both layers, preferably within closed cells as diagrammatically shown on the Figures. Thus the percentage in question could be equal to 30% for the layer 3 with the higher modulus of elasticity and to 35% for the layer 5 with a lower modulus of elasticity.

As to the thicknesses of both layers of cellular rubber 3 and 5 they may lie each one between 0.1 and 0.8 mm. It is thus possible to provide a thickness of 0.45 mm for the layer 3 and a thickness of 0.5 mm for the layer 5.

The thickness of the layer of fabric or the like 4 held in sandwich-like fashion between both layers of cellular rubber 3 and 5 could lie between about 0.1 and 1 mm and be for instance equal to 0.35 mm.

As to the thickness of the layer 2 of hard elastomer it should lie between about 0.5 and 0.05 mm and will preferably be equal to 0.15 mm.

Now for a better understanding of the invention the outstanding interest and advantages of the blanket of the invention as compared with a prior art blanket, i.e. a blanket of the kind currently used nowadays and with a blanket according to the document FR-A-2,461,596 will be explained hereinafter.

Reference should be had to the Table which follows and which indicates the various layers of the three blankets referred to hereinabove and for which has been adopted a same thickness so that the results be comparable.

| Thicknesses (mm) | BLANKET | | |
|---|---|---|---|
| | Invention | Prior Art | Document FR-A-2,461,596 |
| 0.2 | Lithographic layer | Lithographic layer | Lithographic layer |
| 0.15 | Hard layer | Hard layer | Hard layer |
| 0.45 | Cellular rubber | Fabric | Cellular rubber |
| 0.35 | Fabric | Cellular rubber | Base layer (fabric + neoprene) |
| 0.5 | Cellular rubber | Fabric | |
| 0.35 | Base layer (fabric) | Base layer (fabric) | |

More specifically it is seen on this Table from the left-hand side that the first column indicates the thicknesses in millimeters of the layers. In the second column are given the successive layers of a blanket according to the invention and such as shown on FIG. 2. In the third column are given the successive layers of a blanket according to the prior art which comprises as mentioned at the beginning of this description a layer of cellular rubber interposed between two layers of fabric whereas the blanket of the invention on the contrary comprises a layer of fabric interposed between two layers of cellular rubber. At last in the fourth column of the Table are given the layers of the blanket according to the document FR-A-2,461,596 which as should be recalled only comprises one single layer of cellular rubber and a base layer consisting of several layers of fabric bonded with neoprene. In the three cases as seen on the Table a hard layer of elastomer is associated with the lithographic layer.

The behaviour in compression of the three blankets mentioned hereinabove has been studied with regard to the material of the blanket which is driven or shifted upon the compression to the right and/or to the left of the center O of the pressure area as shown by the arrows F on FIG. 3.

Reference should be had to FIG. 4 which shows the displacement of material or the shearing C plotted versus the distance D with respect to the center O of the pressure area and this for the three blankets of the Table referred to hereinabove. It is immediately seen that the curve C1 which corresponds to the blanket of the invention is substantially flat, i.e. practically no sidewise displacement of the material of the blanket according to the invention occurs upon compression contrary to the prior art blanket (curve C2) and to the blanket according to the document FR-A-2,461,596 (curve C3) which however exhibits a less marked tendency to shearing than the blanket according to the prior art (curve C2).

It is thus understood that with the blanket of the invention the quality of impression and the travelling of the web of paper P passing between both blanket-carrying cylinders (FIG. 3) are very substantially improved in view of the absence of sidewise displacement or of shearing at the surface. This means that the blankets of the invention will have a neutral dynamic behaviour when rolling on the web of paper P.

Furthermore it should be noted that with a distance AA' given by the machine (see FIG. 3) it is advisable to have a lower generated pressure. In other words it is advisable to obtain a gain in compressibility in order in particular as explained at the beginning of this description to avoid any sagging of the blanket in the long run.

Figure 5:
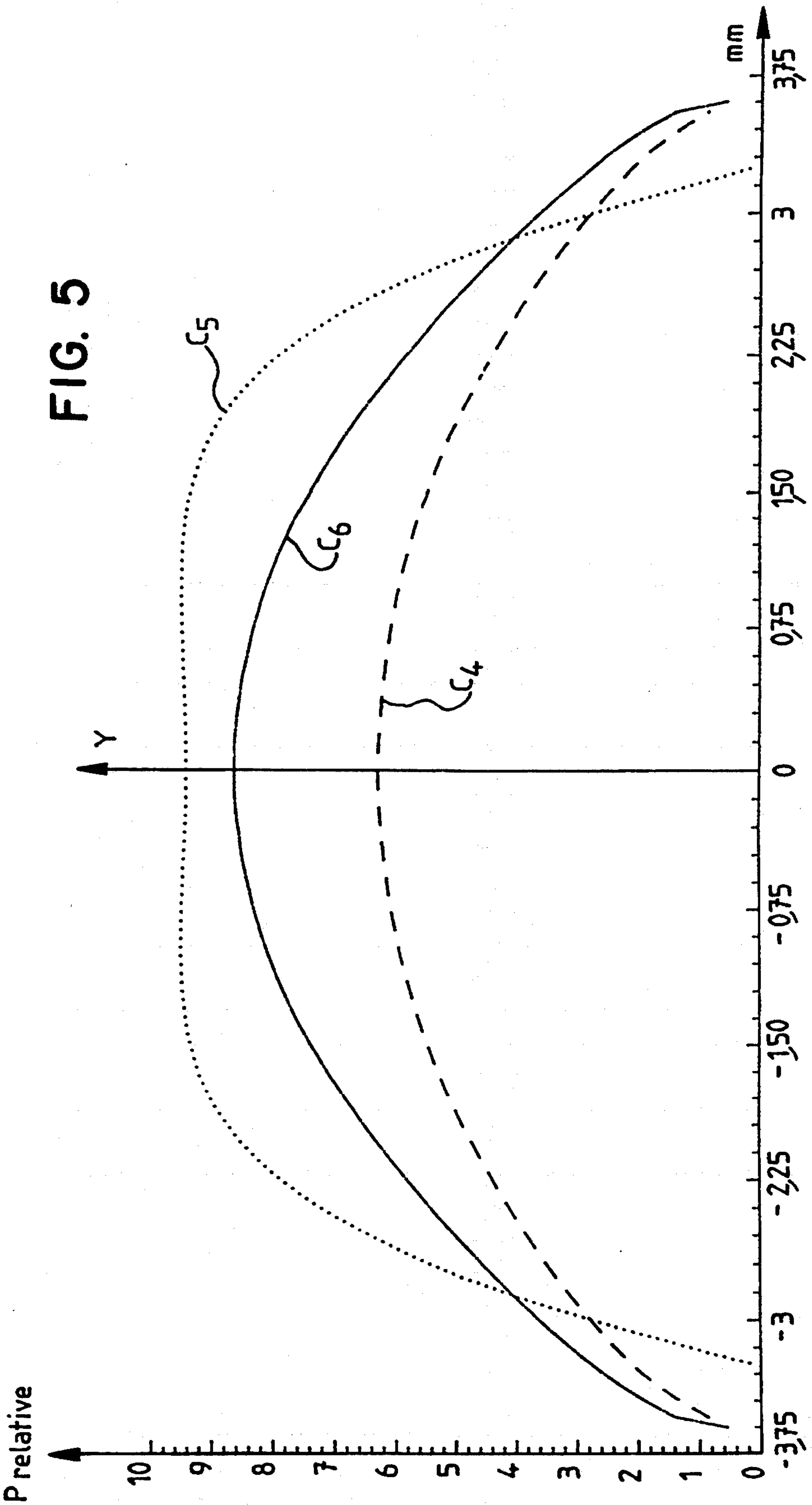
FIG. 5 still shows three curves illustrating the relative pressure in the gap between blankets for the three blankets referred to hereinabove versus the position on the axis of the abscissae OX with respect to the center O of the pressure area.

This gain in compressibility is clearly illustrated by the curve C4 of FIG. 5 corresponding to the blanket according to this invention. This curve shows that the gain in compressibility with respect to the blankets of the prior art (curve C5) and to the blankets according to the document FR-A-2,461,596 (curve C6) is definitely improved the latter however exhibiting some gain in compressibility with respect to the blankets of the prior art (curve C5).

It results from all the foregoing that the blanket according to the invention is remarkable in particular from the standpoint of the gain in compressibility and of the absence of shearing which reflects advantageously upon the quality of impression of the paper, upon the flow rate or the travelling of the paper and upon the service life of the blanket, this essentially owing to the provision in the said blanket of a layer of fabric held in sandwich-fashion between two layers of cellular rubber having identical or different moduli of elasticity.

It should be understood that the invention is not at all limited to the embodiments described and illustrated which have been given by way of example only.

On the contrary, the invention comprises all the technical equivalents of the means described as well as their combinations if the latter are carried out according to its gist.

It is claimed:

1. An elastic and compressible printing blanket, comprising:

an outer lithographic or printing layer;

a hard elastomer layer disposed against and beneath said outer layer;

a three-layer unit disposed beneath and against said hard elastomer layer, said three-layer unit comprising first and second cellular rubber layers and a fabric layer having a thickness in the range of 0.1–1.0 mm., said fabric layer being interposed between said cellular rubber layers, said first cellular rubber layer being disposed outward of and having a modulus of elasticity in compression higher than said second cellular rubber layer, said first cellular rubber layer having a modulus of elasticity of 0.2–50 megapascals and said second cellular rubber layer having a modulus of elasticity of 0.1–25 megapascals, said cellular rubber layers each having a thickness of 0.1–0.8 mm., and said three layer unit being mounted around a cylinder, whereby sidewise displacement of said printing blanket is minimized during compressed rotation.

2. The printing blanket of claim 1 further comprising a base layer disposed against said second cellular rubber layer.

3. The printing blanket of claim 1 wherein said second cellular rubber layer is connected to said cylinder.

4. The printing blanket of claim 1 wherein said first cellular rubber layer has a modulus of elasticity of 1.0 megapascals and said second cellular rubber layer has a modulus of elasticity of 5 megapascals.

5. The printing blanket of claim 1 wherein said cellular rubber layers enclose a gas volume of 10–80%.

6. The printing blanket of claim 1 wherein said cellular layers are comprised of closed cells.

7. The printing blanket of claim 5 wherein said first cellular rubber layer encloses a gas volume of 30% and said second cellular rubber layer encloses a gas volume of 35%.

* * * * *

UNITED STATES PATENT AND TRADEMARK OFFICE

CERTIFICATE OF CORRECTION

PATENT NO. : 5,431,989

DATED : July 11, 1995

INVENTOR(S) : Michel Beltzung and Bertrand Felly

It is certified that error appears in the above-indentified patent and that said Letters Patent is hereby corrected as shown below:

Column 2, line 51, "fop" should read -- for --.

Column 6, claim 4, line 32, "1.0" should read -- 10 --.

Signed and Sealed this

Twentieth Day of February, 1996

*Attest:*

Bruce Lehman

BRUCE LEHMAN

*Attesting Officer*

*Commissioner of Patents and Trademarks*